US008724166B2

(12) United States Patent
Nakabayashi

(10) Patent No.: US 8,724,166 B2
(45) Date of Patent: May 13, 2014

(54) IMAGE READING APPARATUS AND IMAGE FORMING APPARATUS WITH BLANK PAGE ADJUSTMENT

(75) Inventor: Masahiro Nakabayashi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 296 days.

(21) Appl. No.: 12/764,282

(22) Filed: Apr. 21, 2010

(65) Prior Publication Data
US 2010/0271645 A1 Oct. 28, 2010

(30) Foreign Application Priority Data

Apr. 23, 2009 (JP) ................................. 2009-105471

(51) Int. Cl.
*G06F 15/00* (2006.01)
(52) U.S. Cl.
USPC .......................................................... 358/1.9
(58) Field of Classification Search
None
See application file for complete search history.

(56) References Cited

U.S. PATENT DOCUMENTS

| 4,928,128 A * | 5/1990 | Stemmle ....................... 399/364 |
| 7,535,591 B2 * | 5/2009 | Kujirai ......................... 358/1.16 |
| 2002/0015178 A1 * | 2/2002 | Tamaru ........................ 358/1.15 |
| 2002/0122189 A1 * | 9/2002 | Salgado ......................... 358/1.6 |
| 2002/0163672 A1 * | 11/2002 | Yoshida et al. ................ 358/400 |
| 2002/0171876 A1 * | 11/2002 | Yoshida ........................ 358/400 |
| 2005/0276641 A1 * | 12/2005 | Morita .......................... 399/382 |

FOREIGN PATENT DOCUMENTS

JP 2001-245074 A 9/2001

* cited by examiner

*Primary Examiner* — Jeremiah Bryar
(74) *Attorney, Agent, or Firm* — Marvin A. Motsenbocker; Mots Law, PLLC

(57) ABSTRACT

An image reading apparatus includes: an image reader configured to read both sides of sheets of an original document to generate page images thereof; an attribute information supplier configured to attach, to the page image of each page, attribute information including a page number of the corresponding page in the original document and a distinction whether the corresponding page is a front side or a back side of the sheet of the original document, when the page image is not a blank page; and an electronic file generator configured to generate an electronic file by integrating non-blank page images, which are the page images with no blank pages.

7 Claims, 10 Drawing Sheets

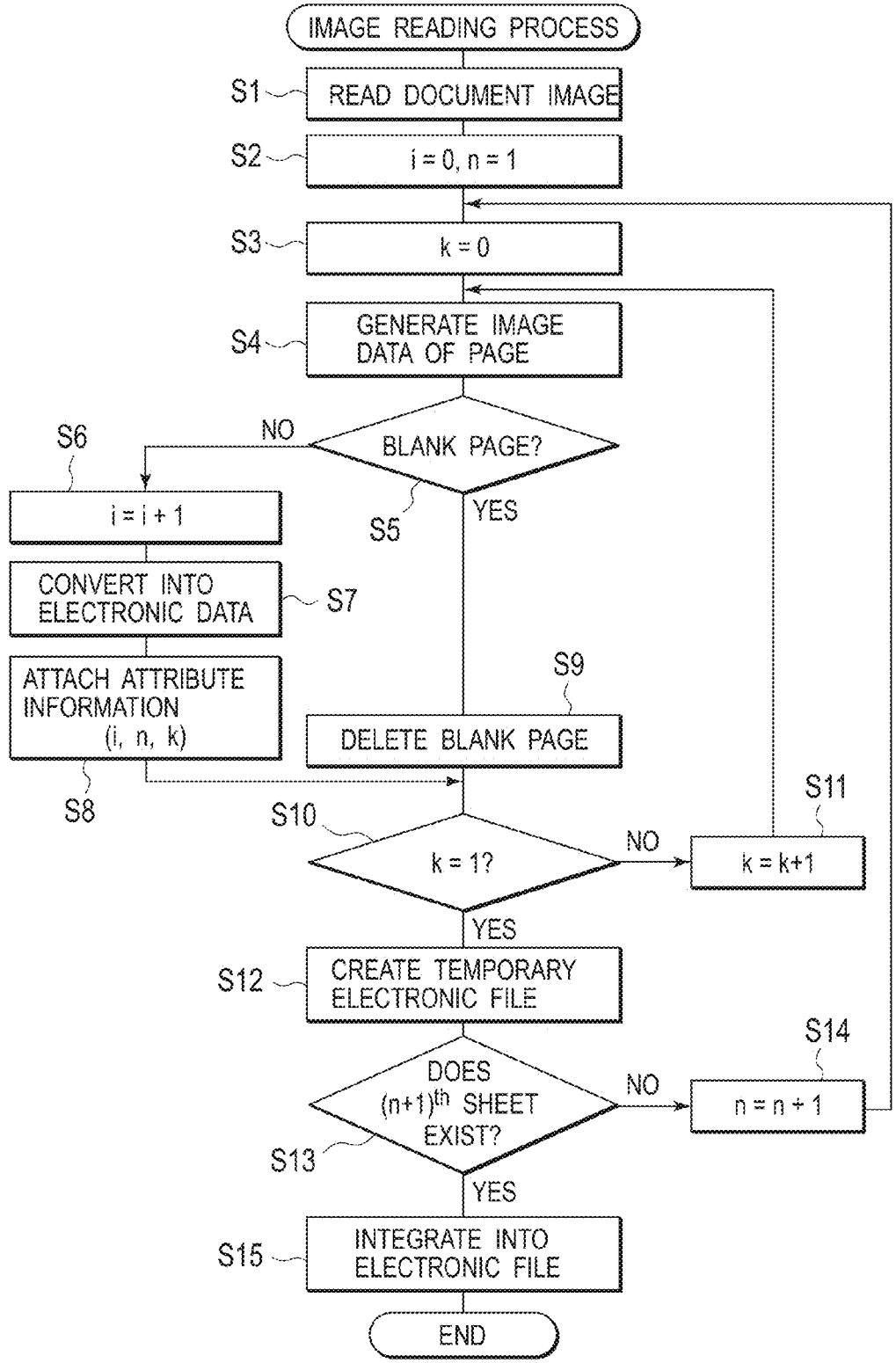

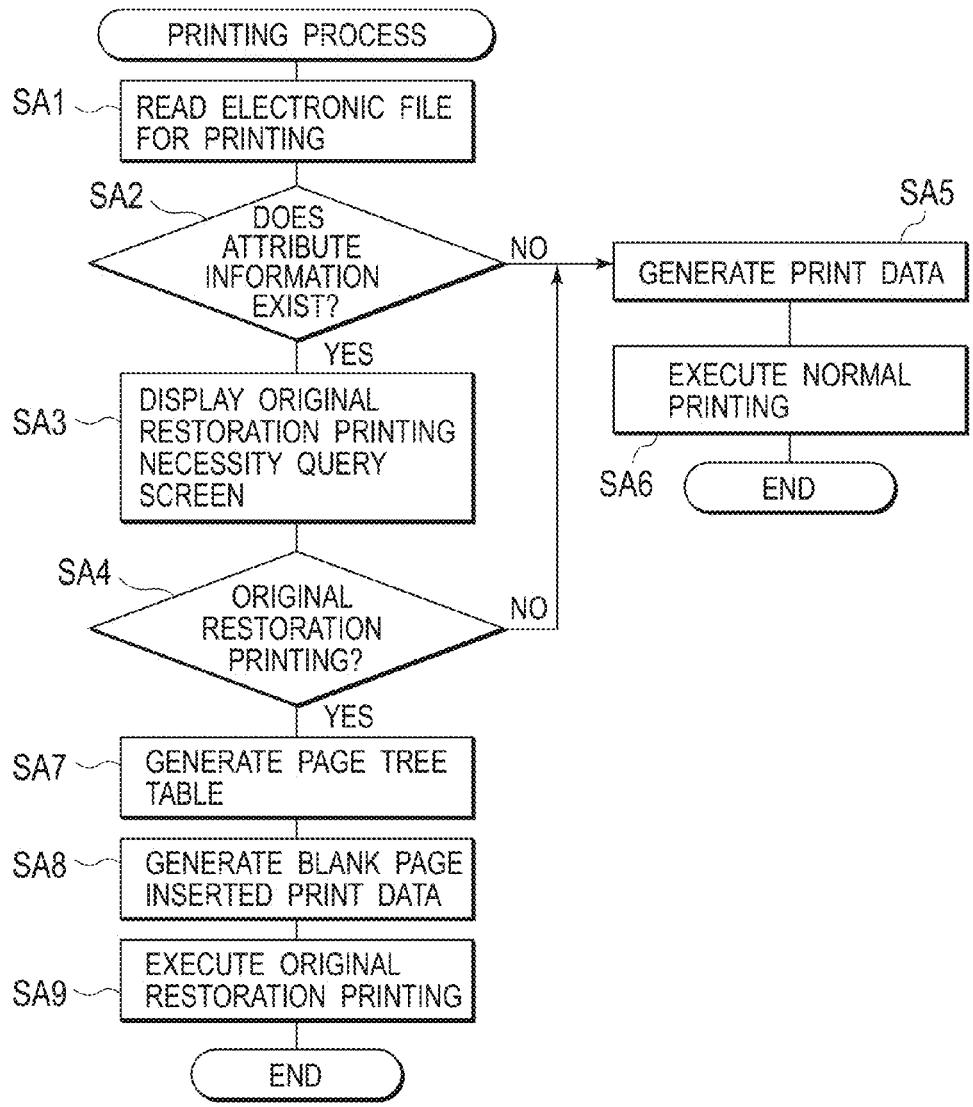
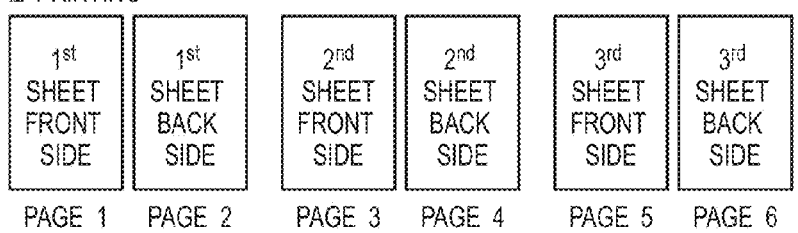

FIG. 7

| PRINT PROCESS | PRINTING UNIT 21 | WAIT SECTION 47 | DISCHARGE |
|---|---|---|---|
| G1 | 1st SHEET FRONT SIDE PRINTING | NONE | NONE |
| G2 | 2st SHEET FRONT SIDE PRINTING | 1st SHEET | ↑ |
| G3 | 1st SHEET BACK SIDE PRINTING | 2nd SHEET | ↑ |
| G4 | 2st SHEET | NONE | 1st SHEET |
| G5 | 3rd SHEET FRONT SIDE PRINTING | ↑ | 2nd SHEET |
| G6 | 4th SHEET FRONT SIDE PRINTING | 3rd SHEET | ↑ |
| G7 | 3rd SHEET | 4th SHEET | ↑ |
| G8 | 4th SHEET BACK SIDE PRINTING | NONE | 3rd SHEET |
| G9 | NONE | ↑ | 4th SHEET |

FIG. 8

ORIGINAL RESTORATION PRINTING

| 1st SHEET FRONT SIDE | 1st SHEET BACK SIDE | 2nd SHEET FRONT SIDE | 2nd SHEET BACK SIDE | 3rd SHEET FRONT SIDE | 3rd SHEET BACK SIDE | 4th SHEET FRONT SIDE | 4th SHEET BACK SIDE |
|---|---|---|---|---|---|---|---|
| PAGE 1 | PAGE 2 | PAGE 3 | BLANK PAGE | PAGE 4 | BLANK PAGE | PAGE 5 | PAGE 6 |

FIG. 13

| PRINT PROCESS | PRINTING UNIT 21 | WAIT SECTION 47 | ESCAPE SECTION 55 | DISCHARGE |
|---|---|---|---|---|
| GA1 | 1st SHEET FRONT SIDE PRINTING | NONE | NONE | NONE |
| GA2 | 2nd SHEET FRONT SIDE PRINTING | 1st SHEET | ↑ | ↑ |
| GA3 | 1st SHEET BACK SIDE PRINTING | NONE | 2nd SHEET | ↑ |
| GA4 | 3rd SHEET FRONT SIDE PRINTING | ↑ | ↑ | 1st SHEET |
| GA5 | 4th SHEET FRONT SIDE PRINTING | ↑ | 3rd SHEET | 2nd SHEET |
| GA6 | NONE | 4th SHEET | NONE | 3rd SHEET |
| GA7 | 4th SHEET BACK SIDE PRINTING | NONE | ↑ | NONE |
| GA8 | NONE | ↑ | ↑ | 4th SHEET |

US 8,724,166 B2

IMAGE READING APPARATUS AND IMAGE FORMING APPARATUS WITH BLANK PAGE ADJUSTMENT

CROSS REFERENCE TO RELATED APPLICATIONS

This application claims priority based on 35 USC 119 from prior Japanese Patent Application No. P2009-105471 filed on Apr. 23, 2009, entitled "Image Reading Apparatus and Image Forming Apparatus", the entire contents of which are incorporated herein by reference.

BACKGROUND OF THE INVENTION

1. Field of the Invention

The invention relates to an image reading apparatus configured to generate an electronic file from document images read by an image reader such as a scanner, and an image forming apparatus configured to print the document images based on the electronic file generated by the image reading apparatus on media such as print sheets.

2. Description of Related Art

With the development of MFP's (Multi-Function Printers), various methods for digitizing and printing document images have been proposed recently.

Such digitized images of the original document are integrated into an electronic file. Such electronic files contain large volumes of data. Reducing such large volumes of data volume in these electronic files is desired.

Conventional image reading apparatus scan the front and back sides of original document sheets, which includes one-side printed sheets and double-side printed sheets, with a scanner having an ADF (Automatic Document Feeder), determines, based on the number of black pixels in scanned image data of each page, whether the scanned image data of the page is a blank page or a non-blank page, and outputs the scanned image data of non-blank pages to a computer without outputting the scanned images data of blank pages to the computer (For example, Japanese Patent Application Laid-Open No. 2001-245074 (Paragraphs. 0023 to 0024, 0028 to 0033, and FIGS. 2 and 3)).

SUMMARY OF THE INVENTION

In the conventional technique, the scanned image data of the non-blank pages are output while the scanned image data of the blank pages are automatically skipped, and an electronic file is generated by integrating the output the scanned image data of the non-blank pages. Upon printing the electronic file, print data including the non-blank page image data without the blank page image data are generated. Therefore, there is a problem that a printout of the print data does not have the same page configuration as the original document.

An first aspect of the invention is an image reading apparatus including: an image reader configured to read both sides of sheets of an original document to generate page images thereof; an attribute information supplier configured to attach, to the page image of each page, attribute information including a page number of the corresponding page in the original document and a distinction whether the corresponding page is a front side or a back side of the sheet of the original document, when the page image is not a blank page; and an electronic file generator configured to generate an electronic file by integrating non-blank page images, which are the page images with no blank pages.

An second aspect of the invention is an image forming apparatus including: an attribute information extractor configured to read the attribute information of each page image from the electronic file generated by the image reading apparatus of the first aspect; a printing unit configured to print images on media; and a controller configured to control the printing unit, based on the read attribute information and the non-blank page images in the electronic file, and to print images having the same page configuration as the original document with the blank page.

According to the first aspect of the invention, the attribute information is attached to the electronic file having the read page images without the blank pages. Therefore, a page configuration that is the same as the original document with the blank page can be created and printed based on the electronic file without the blank page.

According to the second aspect of the invention, the page configuration that is the same as the original document with the blank page can be created and printed based on the electronic file without the blank page.

BRIEF DESCRIPTION OF THE DRAWINGS

FIG. 3 is a flowchart of a reading process according to the first embodiment.

FIG. 4 is a flowchart of a printing process according to the first embodiment.

FIG. 5 is an explanatory view of printouts of a normal printing according to the first embodiment.

FIG. 7 is an explanatory view showing a printing process of original restoration printing according to the first embodiment.

FIG. 8 is an explanatory view of printouts of the original restoration printing according to the first embodiment.

FIG. 13 is an explanatory view of a printing process of the original restoration printing according to the second embodiment.

DETAILED DESCRIPTION OF THE EMBODIMENTS

Figure 1:
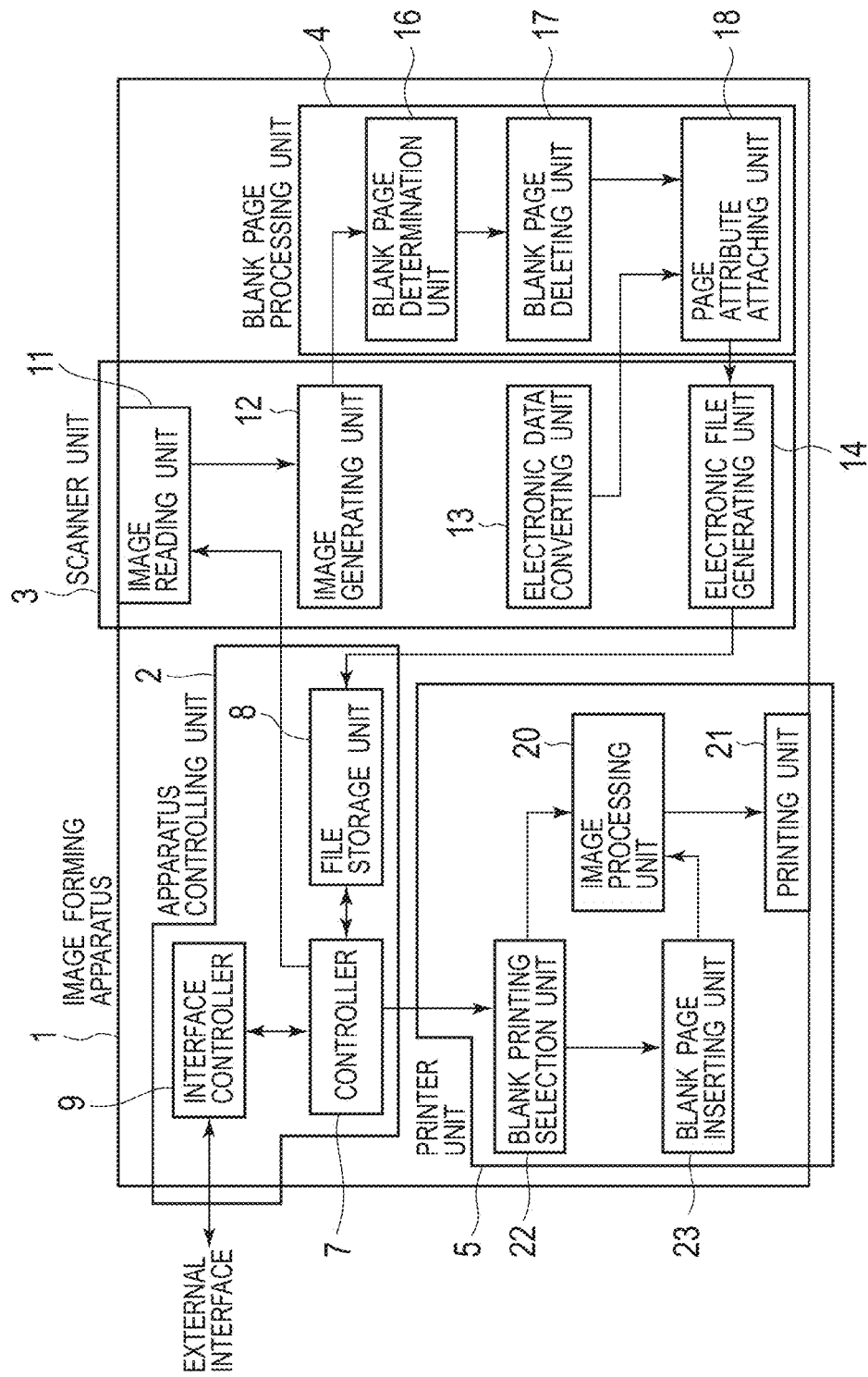
FIG. 1 is a block diagram of an image forming apparatus of a first embodiment.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, an image reading apparatus and an image forming apparatus of the embodiments according to the invention will be described with reference to the drawings.

First Embodiment

Figure 2:
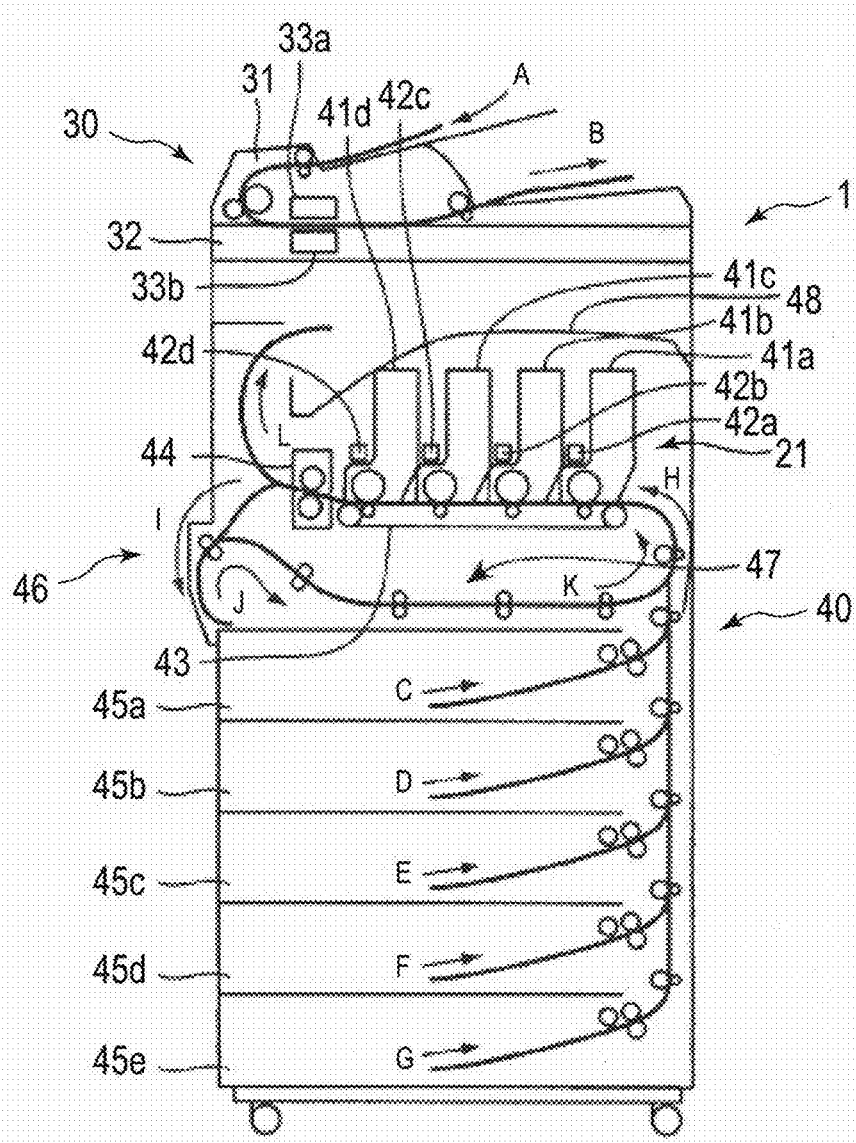
FIG. 2 is a schematic view of the configuration of the image forming apparatus of the first embodiment.

FIG. 1 is a block diagram of an image forming apparatus of the first embodiment, FIG. 2 is a schematic view of the configuration of the image forming apparatus of the first embodiment, FIG. 3 is a flowchart of a reading process according to the first embodiment, and FIG. 4 is a flowchart of a printing process according to the first embodiment.

In FIG. 1, reference number 1 designates the image forming apparatus. Image forming apparatus 1 is aMFP (Multi-Functional Printer) including apparatus controlling unit 2, scanner unit 3 (image reading apparatus), blank page processing unit 4, and printer unit 5.

Apparatus controlling unit 2 includes controller 7, file storage unit 8, and interface controller 9 (I/F controller).

Controller 7 executes overall control of the functions of image forming apparatus 1. Controller 7 is run by programs stored in storage (for example, a memory) and controls the components of image forming apparatus 1 such as scanner unit 3, printer unit 5, and apparatus controlling unit 2, thereby executing the reading process, and the printing process according to the embodiment.

File storage unit 8 is located in the storage and stores therein files. For example, file storage unit 8 stores therein electronic files that are received from an external apparatus such as a personal computer (not shown), electronic files that are created by scanner unit 3, or the like.

Interface controller 9 provides an interface for users of image forming apparatus 1 by transmitting and receiving control signals and data to and from the external apparatus via a communication method such as a LAN (Local Area Network) or USB (Universal Serial Bus) and transmitting and receiving control signals to and from an operation panel having a display screen provided in image forming apparatus 1. For example, interface controller 9 transmits information to be displayed to the users of image forming apparatus 1, or receives commands input by the users and transmits the input commands to controller 7.

Scanner unit 3 includes image reading unit 11 (an image reader), image generating unit 12, electronic data converting unit 13, and electronic file generating unit 14.

Image reading unit 11 includes a read image storage (not shown) such as a memory to temporarily store therein the read image. Under the control of controller 7, image reading unit 11 optically reads images of both sides or one side of document sheets (the original) by CCD (Charge Coupled Device) or the like, according to a read instruction, including an image reading condition, that is input by the user.

Image generating unit 12 generates image data for each page of the document, based on the image content of the document read by image reading unit 11.

Electronic data converting unit 13 converts the image data of non-blank pages generated by image generating unit 12 into electronic data of a certain format such as PDF (Portable Document Format) or the like.

Electronic file generating unit 14 integrates or combines the electronic data of the pages generated by electronic data converting unit 13 into a single electronic file and stores the integrated electronic file in file storage unit 8.

Blank page processing unit 4 includes blank page determination unit 16, blank page deleting unit 17, and page attribute attaching unit 18.

Blank page determination unit 16 functions to compare a predetermined threshold to the number of black pixels contained in the image data of each page generated by image generating unit 12 and to determine whether or not the compared page is a blank page based on the comparison result.

Blank page deleting unit 17 functions to delete the image data of the blank page determined by blank page determination unit 16 and to transmit the image data of the non-blank page determined by blank page determination unit 16 to electronic data converting unit 13 in order to convert the image data of the non-blank page into electronic data. Blank page deleting unit 17 also functions to output, to page attribute attaching unit 18, a sheet number indicating the order of the original document sheets, a distinction between the front side and the back side of the document sheet, and a page number indicating the order of the pages of the original document, regarding the image data of the page that is being converted by electronic data converting unit 13.

Page attribute attaching unit 18 functions to attach attribution information as a comment including the document sheet number, the distinction between the front side and the back side of the document sheet, the page number, and the like to each page of electronic data output from electronic data converting unit 13.

Printer unit 5 includes image processing unit 20, printing unit 21 (image printing unit), blank printing selection unit 22, and blank page inserting unit 23.

Image processing unit 20 functions to create print data by rasterizing the electronic file that is read and transmitted from file storage unit 8 by controller 7.

Printing unit 21 functions to print the print data transmitted from image processing unit 20 to print sheets as media.

According to an input through interface controller 9 by the user showing whether the user selects normal printing or original restoration printing, blank printing selection unit 22 transfers the electronic file to image processing unit 20 when the normal printing is selected and transfers the electronic file to blank page inserting unit 23 when the original restoration printing is selected. The normal printing is to print according to a page configuration of the electronic file in which all blank pages are deleted. The original restoration printing is to restore the page configuration of the electronic file to the page configuration of the original document in which all blank pages are included and to print according to the original page configuration.

Blank page inserting unit 23 attaches to the electronic file an instruction that instructs to insert a blank page(s) to the same position(s) as the original document, referring to the attribution information in the electronic file and then transmits the electronic file to image processing unit 20.

In FIG. 2, reference number 30 represents a scanning mechanism provided in image reading unit 11 of scanner unit 3. In FIG. 2, the thick solid line in scanning mechanism 30 indicates a sheet conveying path along which document sheets are transported by plural conveying rollers, and arrows A and B in scanning mechanism 30 indicate directions of conveying the document sheets.

Image reading unit 11 of scanner unit 3 includes: automatic document feeder (ADF) 31; flat bed (FB) 32; first reading head 33a, such as a CCD, provided at automatic document feeder 31; and second reading head 33b, such as a CCD, provided at flat bad 32 and facing first reading head 33b such that reading heads 33a and 33b are spaced away from each other. Using first reading head 33a and second reading head 33b at the same time allows reading images of both sides of the document sheet that is inserted in the sheet conveying path along arrow A, sent between the first and second reading heads 33a and 33b, and discharged out of the sheet conveying path along arrow B. That is, using two reading heads 33a and 33b at the same time allows reading images of both sides of the document sheet by a single passage.

Reference number 40 represents a printing mechanism provided in printer unit 5. In FIG. 2, the thick solid lines in printing mechanism 40 indicate conveying paths along which print sheets are transported by plural conveying rollers, and arrows C to L indicate directions of conveying the print sheets.

Printing unit 21 of printer unit 5 includes: image drum unit 41a having a black (K color) toner cartridge; image drum unit 41b having a yellow (Y color) toner cartridge; image drum unit 41c having a magenta (M color) toner cartridge; image drum unit 41d having a cyan (C color) toner cartridge; LED head 42a for black; LED head 42b for yellow; LED head 42c for magenta; LED head 42d for cyan; image transfer belt 43; and fixing unit 44. Printing unit 21 functions to print images, including texts, pictures, or the like, on the print sheets according to the print data created by image processing unit 20.

Reference number 45 represents a paper feeding tray provided in printing mechanism 40. This embodiment has five paper feeding trays 45a, 45b, 45c, 45d, and 45e stacked on one another in a five-tiered structure. Respective paper feeding trays 45a, 45b, 45c, 45d, and 45e contain therein respective sizes of the print sheets which are set in advance.

Reference number 46 represents a reverse section (a medium reverse section). Reverse section 46 functions to turn the print sheet over by conveying the print sheet from printing unit 21 in the direction of arrow I, stopping, and then conveying the print sheet in the direction of arrow J.

Reference number 47 represents a wait section (or a medium waiting section). Wait section 47 is an area in the conveying path where the print sheet temporarily waits to be conveyed (temporarily stops to be conveyed). That is, the turned-over print sheet that was conveyed from reverse section 46 in the direction of arrow J temporarily waits at wait section 47, until further conveyed in the direction of arrow K.

Reference number 48 represents a sheet discharge stage or a stacker where the sheets that were printed by printing unit 21 and conveyed along the direction of arrow L and discharged are accumulated (stacked).

Upon printing images on the print sheet using image forming apparatus 1 having the above configuration, once controller 7 receives a print instruction input from an operation panel (not shown) and transmitted to controller 7 via interface controller 9, controller 7 conveys the print sheet from one of paper feeding trays 45a to 45e that contains the print sheet having an appropriate size for its printing to one of the directions of arrow C to arrow G, and to further convey the print sheet to printing unit 21 along the direction of arrow H by the conveying rollers.

On image drum unit 41 of each color in printing unit 21, a latent image is formed on charged photosensitive drum (image carrier) by emitting light from LED head 42 to the charged photosensitive drum, and the latent image on the photosensitive drum is developed with toner, thereby forming a toner image on the photosensitive drum. The toner image is transferred to one side of the print sheet with the image transfer belt, and then the toner image on the print sheet is fixed by the fixing unit 44.

Upon printing only one side (or the front side) of the print sheet (that is, upon one-side printing), the print sheet is conveyed from printing unit 21 along the direction of arrow L and discharged on sheet discharge stage 48. Upon printing both sides of the print sheet (that is, upon double-side printing), the print sheet is conveyed from printing unit 21 along the direction of arrow I, and turned over at reverse section 46. The turned-over print sheet is conveyed along the directions of arrow J and arrow K to printing unit 21, and then the other side (the back side) of the print sheet is printed in the printing unit 21, and then the double-side printed print sheet is conveyed along the direction of arrow L and discharged on sheet discharge stage 48.

Next, the flow of controlling the reading process according to the embodiment will be described referring to steps shown in FIG. 3.

When image forming apparatus 1 is turned on, controller 7 executes an initialization process of image forming apparatus 1 and puts the components of the image forming apparatus, such as scanner unit 3 and printer unit 5, in a stand-by state (an idle state).

Described is a case where an original document of four sheets (see FIG. 8) is set into scanner unit 3 of image forming apparatus 1 by the user and is then read by image reading unit 11 to form an electronic file according to the embodiment.

1st document sheet front side: page 1
1st document sheet back side: page 2
2nd document sheet front side: page 3
2nd document sheet back side: blank
3rd document sheet front side: page 4
3rd document sheet back side: blank
4th document sheet front side: page 5
4th document sheet back side: page 6

Step S1: When the document is placed in automatic document feeder (ADF) 31 of scanning mechanism 30 and the user inputs from the operation panel an instruction for reading both sides of the sheets of the document and for generating an electronic file, controller 7 reads both sides of all the document sheets using the first and second reading heads 33a and 33b of image reading unit 11 and stores the images of the front side and then the back side in the read order to image reading unit 11 (not shown).

Step S2: After reading both sides of all the document sheets, controller 7 initializes counter "i" to the page number to "0" and initializes counter "n" for the sheet number of the document to "1".

Step S3: Controller 7 sets front/back information "k" to "0" in order to treat the image of the front side of the sheet of document sheet number "n". Note that k=0 indicates the front side of one of the document sheets and k=1 indicates the back side of one of the document sheets.

Step S4: Controller 7 reads a first image (a first page image) stored in the read image storage of image reading unit 11, transmits the first image to image generating unit 12 to create image data (page image data) of the first image (the first page image), and then transfers to blank page determination unit 16 the created image data as image data of the front side (k=0) of document sheet number "n".

Step S5: Controller 7 detects the number of black pixels in the transferred image data by blank page determination unit 16, and divides the number of the detected black pixels by the total pixels of the image data of the read document sheet size, thereby obtaining a duty ratio. The total pixels of the image data is the number of black pixels of the image data assuming that all the pixels of the image data of the read document sheet size are black pixels. When the calculated duty ratio is equal to or less than $1.0 \times 10^{-5}$, controller 7 determines that the image data is a blank page and thus the process proceeds to step S9.

When the calculated duty ratio is greater than $1.0 \times 10^{-5}$, controller 7 determines that the image data is not a blank page and thus the process proceeds to step S6.

Step S6: After determining that the image data is not a blank page, controller 7 increments the page number by adding "1" to page number "i" and attaches page number "i" to the image data transmitted in the above described step S4.

Step S7: Controller 7 transfers the image data having page number "i" attached thereto to electronic data converting unit 13 and then electronic data converting unit 13 converts the image data of page number "i" into electronic data.

Step S8: After converting the image data of page number "i" into the electronic data, controller 7 instructs page attribute attaching unit 18 to attach the attribute information (as a comment) including values of current page number "i", document sheet number "n", and front/back information "k" to the end of a trailer of the electronic data. Then the process proceeds to step S10.

Step S9: After determining that the image data is a blank page, controller 7 instructs blank page deleting unit 17 to delete the image data of the corresponding page and then the process proceeds to step S10.

Step S10: When the front/back information is k=0, that is, the data corresponds to a front side of the document sheet, controller 7 determines that it needs to process the image data of the back side of the sheet of document sheet number "n", and then proceeds to step S11.

When front/back information is k=1, that is, the data corresponds to a back side of the document sheet, controller 7 determines that the process for the image data of the both sides of document sheet number "n" is finished, and then proceeds to step S12.

Step S11: After determining that it needs to process the image data of the back side of the sheet of document sheet number "n", controller 7 increments the front/back information by adding "1" to front/back information k in order to treat the image of the back side of the sheet of document sheet number "n". Then controller 7 proceeds back to step S4 and executes steps S4 to S10 to process the image data of the back side of the sheet of document sheet number "n".

Step S12: After completing processing of the image data of the both sides of document sheet number "n", controller 7 instructs electronic file generating unit 14 to combine electronic data of the front side page image and the back side page image of the sheet of document sheet number "n" to create a temporary electronic file.

The attribute information attached to the electronic data of each page image is handed down and thus written to an end of the trailer of each electronic data of the temporary electronic file.

Step S13: Controller 7 refers to the read image storage of image reading unit 11 and checks if there are page images of a next sheet, that is, the $(n+1)^{th}$ sheet. When there are page images of a next sheet, that is, the $(n+1)^{th}$ sheet, controller 7 determines to continue the process and thus proceeds to step S14.

When there is no images of $(n+1)^{th}$ sheet, controller 7 determines that the process for all of the read document sheets is completed and thus proceeds to step S15.

Step S14: After determining that it needs to continue processing, controller 7 increments the document sheet number by adding "1" to current document sheet number "n" in order to treat an image of a document sheet of the next document number. Controller 7 then proceeds back to step S3, and executes steps S3 to S13 for the next document sheet.

Step S15: After determining that the process for all the read document sheets is completed, controller 7 instructs electronic file generating unit 14 to combine electronic data of the temporary electronic files of the four document sheets (document sheet number "n"=1 to 4) created in above described step 12 to make one integrated electronic file. Then controller 7 writes a total number of sheets of the original document and a total number of pages of the original document to the integrated electronic file, stores the electronic file to file storage unit 8 of image forming apparatus 1, and then ends the reading process according to the embodiment.

Note that the attribute information written to each of the temporary electronic files is handed down to the electronic file, and written to the end of a trailer of the electronic data of each page image in the integrated electronic file.

The attribute information written to the end of the trailer of the electronic data of each page image in the integrated electronic file has the following configuration.

1st document sheet front side: page 1, (i, n, k)=(1, 1, 0)
   attribute information: %% EOF % 1, 1, 0
1st document sheet back side: page 2, (i, n, k)=(2, 1, 1)
   attribute information: %% EOF % 2, 1, 1
2nd document sheet front side: page 3, (i, n, k)=(3, 2, 0)
   attribute information: %% EOF % 3, 2, 0
2nd document sheet back side: blank, no data (N/A)
3rd document sheet front side: page 4 (i, n, k)=(4, 3, 0)
   attribute information: %% EOF % 4, 3, 0
3rd document sheet back side: blank, no data (N/A)
4th document sheet front side: page 5 (i, n, k)=(5, 4, 0)
   attribute information: %% EOF % 5, 4, 0
4th document sheet back side: page 6 (i, n, k)=(6, 4, 1)
   attribute information: %% EOF % 6, 4, 1

Note that codes such as carriage return (CR), line feed (LF), and space (SP) are omitted in the above table.

Thus, it is determined which page corresponds to which side and which sheet of the original document, by referring to the total number of the document sheets that are read.

Further, the electronic file that is created by the blank page deleting process has a decreased data volume. Thus, the number of electronic files capable of being stored in storage unit 8 increases.

After that, controller 7 prints the stored electronic file to the print sheets, according to the desired print instruction input from the operation panel by the user.

Also, according to the transmission request input from an external apparatus requesting for transmitting the electronic file, controller 7 transmits the electronic file to the external apparatus via interface controller 9.

Next, referring to steps shown in FIG. 4, flow of controlling the printing process according to the embodiment will be described.

Step SA1: When the user inputs a print instruction through the operation panel identifying a file number of an electronic file, controller 7 receives the instruction through interface controller 9 and then reads the electronic file corresponding to the file number from file storage unit 8.

In the embodiment, the electronic file that is created by the above described reading process is read.

Step SA2: After reading the corresponding electronic file, controller 7 checks whether there is attribute information for each page at the end of the trailer of the electronic data of each image data in the electronic file. When there is attribute information, controller 7 proceeds to step SA3. When there is no attribute information, controller 7 executes normal printing and then proceeds to step SA5.

Step SA3: after determining that attribute information of pages is attached to the electronic file, controller 7 instructs blank printing selection unit 22 to ask the user if original restoration printing is necessary.

That is, controller 7 shows an original restoration printing necessity query screen on the display of the operation panel via interface controller 9, and waits for a selection input from the user. The original restoration printing necessity query screen shows an inquiry message for inquiring as to the necessity of original restoration printing, and shows selection buttons for selecting or not selecting original restoration printing. The inquiry message asks which is to be executed, the original restoration printing to print according to the same page configuration as the original document in which all blank pages are included, or the normal printing to print according to a page configuration in which all blank pages are deleted.

When the user selects one of the original restoration printing or the other (the normal printing), that is, when the user judges the necessity of original restoration printing, controller 7 identifies the user's selection and thus proceeds to step SA4.

Step SA4: After detecting the user selection, controller 7 proceeds to step SA7 when the user selection is original restoration printing or proceeds to step SA5 when the user selection is the normal printing.

Step SA5: After determining that normal printing is to be executed, controller 7 reads a PDF page tree configuration from the read electronic file having the page configuration in which the blank pages are deleted, and then transfers the electronic file to image processing unit 20. Image processing unit 20 rasterizes the electronic data of each page in the electronic file, thereby generating print data for normal printing.

Step SA6: After generating the print data for normal printing, controller 7 executes, based on the generated print data for normal printing, normal printing according to the printing processes F1 to F7 in which the print data are printed in order of page number of the electronic file on both sides of the print sheets.

Process F1: Controller 7 selects one of paper feeding trays 45*a* to 45*e* (for example, paper feeding tray 45*a*) that contains appropriate print sheets to print the print data. Then controller 7 feeds the 1st print sheet from paper feeding tray 45*a* in the direction of arrow C, transports it to printing unit 21 in the direction of arrow H, and prints the print data of page number 1 on the front side of the 1st print sheet.

Process F2: After printing on the front side of the 1st print sheet, controller 7 transports the 1st print sheet to reverse section 46 in the direction of arrow I and then to the wait section in the direction of arrow J so that the 1st print sheet is turned over at reverse section 46, and makes the turned-over 1st print sheet wait at wait section 47. At the same time, controller 7 feeds the 2nd print sheet from paper feeding tray 45*a* to printing unit 21 and prints the print data of page number 3 on the front side of the 2nd print sheet Process F3: After printing on the front side of the 2nd print sheet, controller 7 transports the 1st print sheet that is turned over and waited at wait section 47 to printing unit 21 along the direction of arrow K, and prints the print data of page number 2 on the back side of the 1st print sheet. At the same time, controller 7 transports the 2nd print sheet to reverse section 46, and makes the turned-over 2nd print sheet wait at wait section 47

Process F4: After printing the back side of the 1st print sheet, controller 7 transports the 1st print sheet, on whose front side the print data of page number 1 is printed and on whose back side the print data of page number 2 is printed, in the direction of arrow L thereby discharging it onto sheet discharge stage 48. At the same time, controller 7 transports the turned-over 2nd print sheet that waits at wait section 47 to printing unit 21 and prints the print data corresponding to page number 4 on the back side of the 2nd print sheet.

Process F5: After printing on the back side of the 2nd print sheet, controller 7 discharges to sheet discharge stage 48 the 2nd print sheet, on whose front side the print data of page number 3 is printed and on whose back side the print data of page number 4 is printed. At the same time, controller 7 feeds the 3rd print sheet from paper feeding tray 45*a* to printing unit 21, and prints the print data of page number 5 on the front side of the 3rd print sheet.

Process F6: After printing on the front side of the 3rd print sheet, controller 7 transports the 3rd print sheet to reverse section 46 and to wait section 47 so that the 3rd print sheet is turned over, and makes the turned-over 3rd print sheet wait at wait section 47.

Process F7: Next, controller 7 transports the turned-over 3rd print sheet that waits at wait section 47 to printing unit 21, and prints the print data of page number 6 on the back side of the 3rd print sheet. Controller 7 then discharges the 3rd print sheet, on whose front side the print data of page number 5 is printed and on whose back side the print data of page number 6 is printed, by transporting the 3rd print sheet in the direction of arrow L.

In this way, normal printing of the embodiment including the seven processes F1 to F7 is executed. After finishing the normal printing, controller 7 ends the printing process.

This forms a printout shown in FIG. 5 having the three print sheets on which the electronic data of only non-blank pages integrated in the electronic file are printed in series in order of the page numbers.

Figure 6:
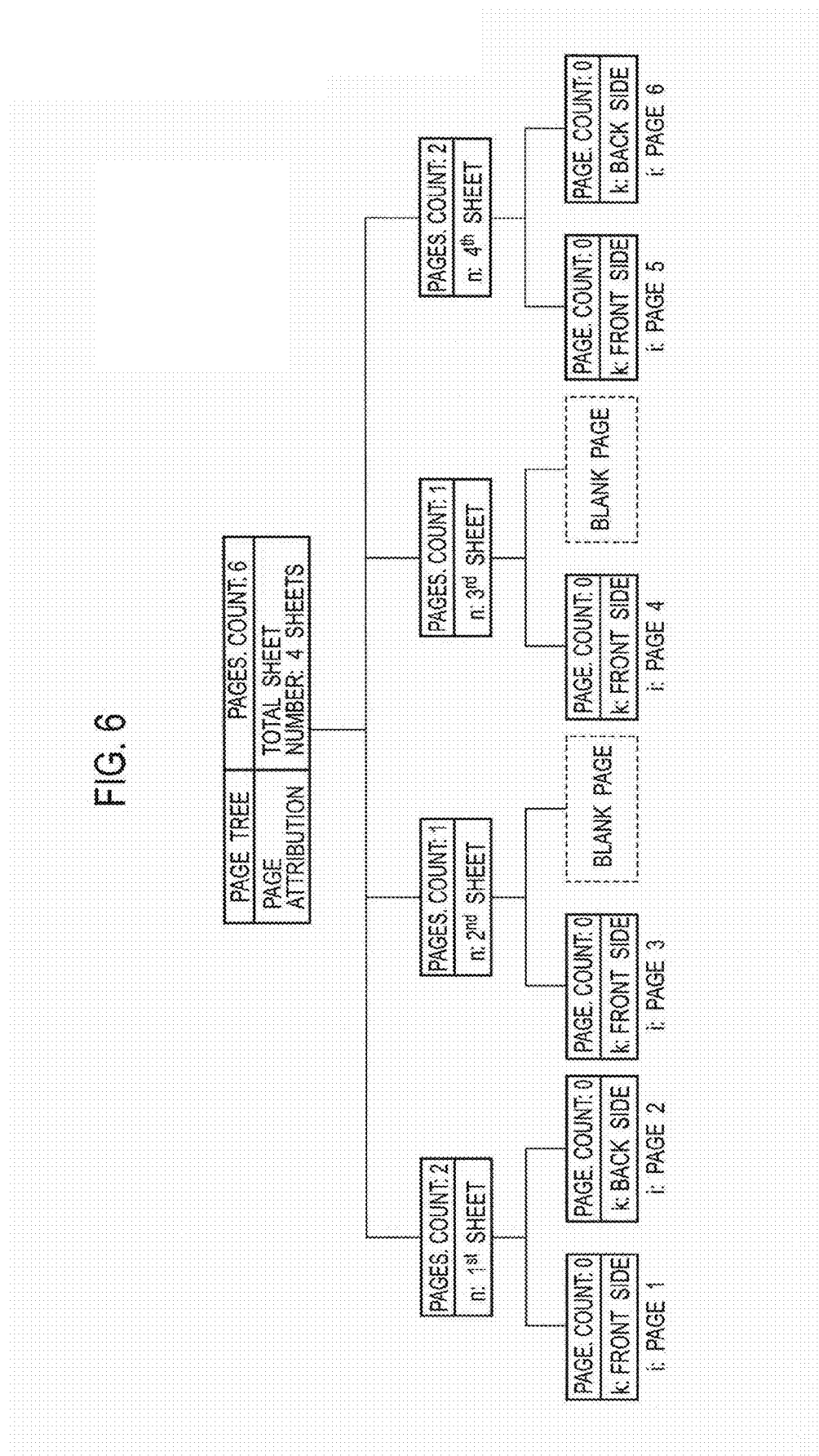
FIG. 6 is an explanatory view of a configuration example of a page tree according to the first embodiment.

Step SA7: After determining that original restoration printing is to be executed, controller 7 transfers the electronic file, in whose page configuration the blank pages are deleted, to blank page inserting unit 23. Blank page inserting unit 23 reads the PDF page tree configuration from the electronic file, and reads each page attribute information as a comment written in the end of the trailer of each electronic page data in the electronic file, the total number of the sheets of the original document and the total number of the pages of the original document, and then creates, based on these, a page tree table shown in FIG. 6.

The page tree table shows that the electronic file has a configuration of the electronic data, showing that the total number of sheets of the original document is four, the total page number of the original document is 6, the front side of the 1st sheet has the electronic data of page number 1, the back side of the 1st sheet has the electronic data of page number 2, the front side of the 2nd sheet has the electronic data of page number 3, the back side of the 2nd sheet is a blank page and deleted, the front side of the 3rd sheet has the electronic data of page number 4, the back side of the 3rd sheet is a blank page and deleted, the front side of the 4th sheet has the electronic data of page number 5, and the back side of the 4th sheet has the electronic data of page number 6.

Step SA8: After creating the page tree table, controller 7 instructs blank page inserting unit 23 and specifies, based on the created page tree table, a position as a blank page insertion position between pages where the blank page needs to be inserted (in this embodiment, a position between page number 3 and page number 4, and a position between page number 4 and page number 5), and attaches an insertion instruction, which instructs insertion of blank page raster data to each blank page insertion position, to the electronic file, and then transmits the electronic file to image processing unit 20.

After transmitting the electronic file to image processing unit 20, controller 7 instructs image processing unit 20 and rasterizes the electronic data of each page in the electronic file while inserting the blank page raster data to each instructed blank page insertion position, so that blank page inserted print data for original restoration printing, which comprises raster data having the same page configuration as the original having the blank pages.

Step SA9: After creating the blank page inserted print data, controller 7 executes, based on the blank page inserted print data, original restoration printing according to the printing processes G1 to G9 shown in FIG. 7, in which each page of the electronic file is printed with the same page configuration as the original document according.

Note that FIG. 7 shows positions of the print sheets at processes G1 to G9.

Process G1: Like above described process F1, controller 7 instructs printing unit 21 to print the print data of page number 1 on the front side of the 1st print sheet.

Process G2: After printing on the front side of the 1st print sheet, controller 7 makes the turned-over 1st print sheet wait at wait section 47 and prints the print data of page number 3 on the front side of the 2nd print sheet by using printing unit 21, like above described process F2.

Process G3: After printing on the front side of the 2nd print sheet, controller 7 prints the print data of page number 2 on the back side of the turned-over 1st print sheet that waited at wait section 47 by using printing unit 21, and makes the turned-over 2nd print sheet wait at wait section 47, like above described process F3.

Process G4: after printing on the back side of the 1st print sheet, controller 7 transports the 1st print sheet, on whose front side the print data of page number 1 is printed and on whose back side the print data of page number 2 is printed, in the direction of arrow L to discharge it onto sheet discharge stage 48. At the same time, controller 7 transports the turned-over 2nd print sheet that waited at wait section 47 to printing unit 21, and prints print data of the blank page raster data on the back side of the 2nd print sheet.

In this way, no color is transferred to the back side of the 2nd print sheet, and the back side thus becomes a blank page having the original color of the back side.

Process G5: After printing the blank page on the back side of the 2nd print sheet, controller 7 discharges the 2nd print sheet, on whose front side the print data of page number 3 is printed and on whose back side is the blank page. At the same time, controller 7 feeds the 3rd print sheet from paper feeding tray 45a to printing unit 21 and prints the print data of page number 4 on the front side of the 3rd print sheet.

Process G6: After printing on the front side of the 3rd print sheet, controller 7 transports the 3rd print sheet to reverse section 46 and makes the turned-over 3rd print sheet wait at wait section 47. At the same time, controller 7 feeds the 4th print sheet from paper feeding tray 45a to printing unit 21 and prints the print data of the page number 5 on the front side of the 4th print sheet.

Process G7: After printing on the front side of the 4th print sheet, controller 7 transports the turned-over 3rd print sheet that waited at wait section 47 to printing unit 21 and prints the blank page raster data of the print data on the back side of the 3rd print sheet to make the back side a blank page. At the same time, controller 7 transports the 4th print sheet to reverse section 46 and to wait section 47 so that the 4th print sheet is turned over, and makes the turned-over 4th print sheet wait at wait section 47.

Process G8: After printing on the back side of the 3rd print sheet, controller 7 discharges the 3rd print sheet, on whose front side the print data of page number 4 is printed and on whose back side is the blank page, while controller 7 transports the turned-over 4th print sheet that waited at wait section 47 to printing unit 21 and prints the print data of page number 6 on the back side of the 4th print sheet.

Process G9: Then, controller 7 transports the 4th print sheet, on whose front side the print data of page number 5 is printed and on whose back side the print data of page number 6 is printed, from printing unit 21 in the direction of arrow L so as to discharge it.

In this way, original restoration printing of the embodiment including the nine processes G1 to G9 is executed. After finishing original restoration printing, controller 7 ends the printing process.

This forms a printout shown in FIG. 8 having the four print sheets on which the original document page configuration is printed, by inserting the blank pages to the electronic data of only non-blank pages (without the blank pages) that is integrated in the electronic file.

As described above, this embodiment creates the page tree table from the electronic file whose data volume is reduced by the blank page deleting process, specifies, based on the page tree table, each position (blank page insertion position) between pages where a blank page needs to be inserted, inserts the blank page into the blank page insertion position, and then prints it. Therefore, this embodiment can print based on the original page configuration of the original document, by restoring the page configuration of the electronic file applied by the blank page deleting process to the original page configuration of the original document with the blank pages.

In addition, this embodiment can select and execute either of normal printing without the blank pages or original restoration printing with the restored blank pages, from the single electronic file.

Second Embodiment

Figure 9:
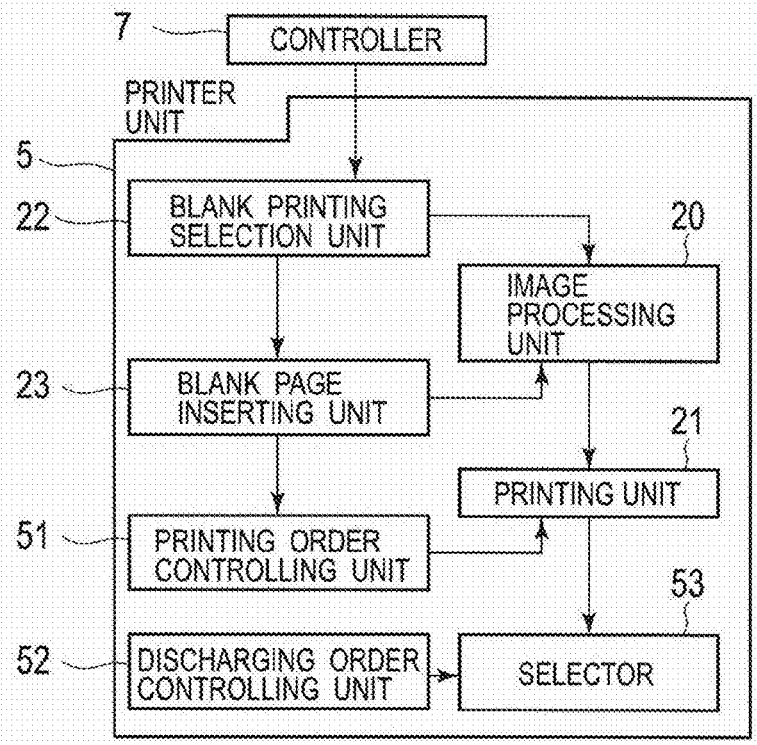
FIG. 9 is a block diagram of a printer unit of a second embodiment.
Figure 10:
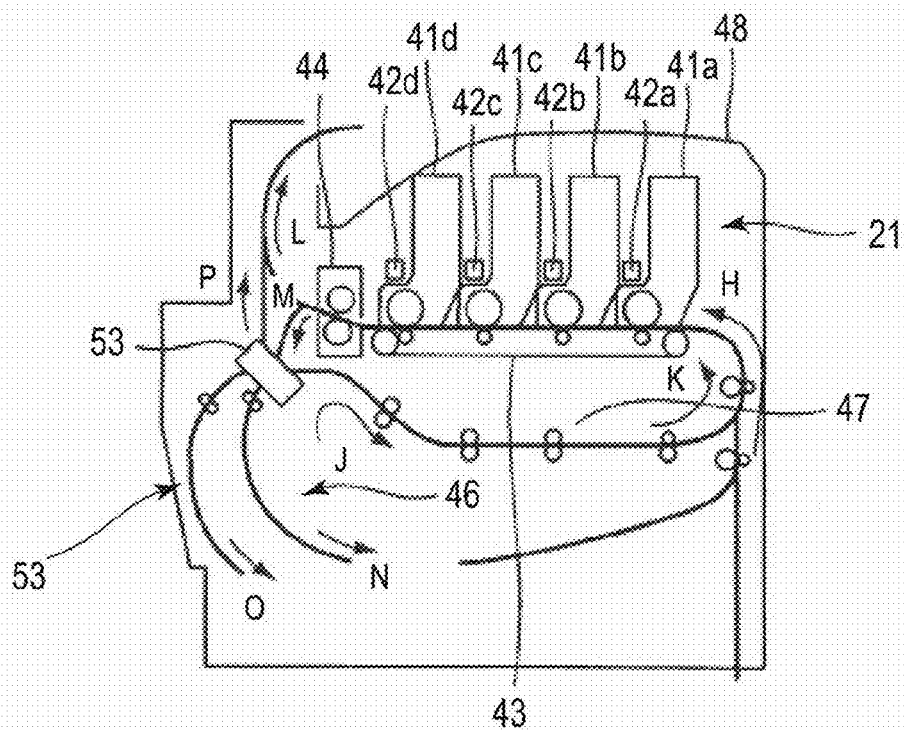
FIG. 10 is an explanatory view of a configuration of a printing mechanism of the second embodiment.
Figure 11:
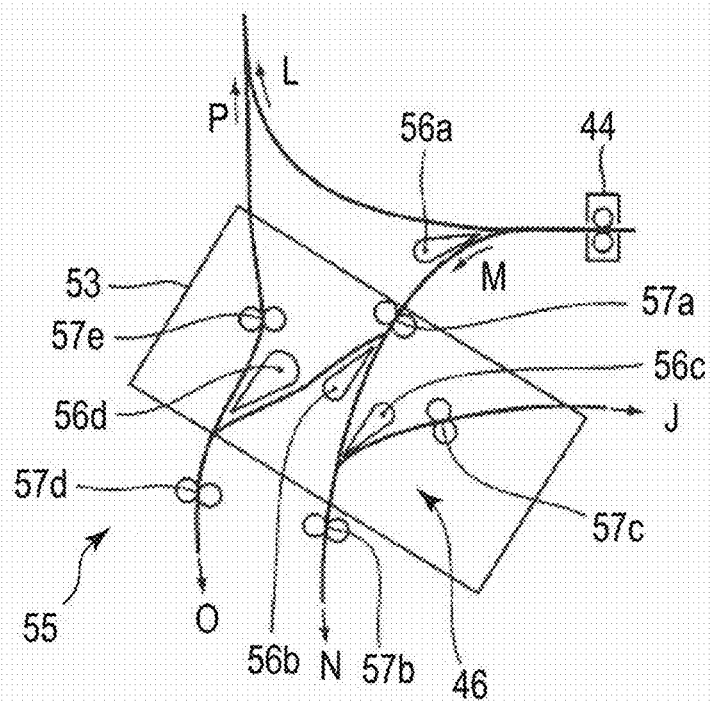
FIG. 11 is an enlarged explanatory view of a configuration in the vicinity of a selector according to the second embodiment.
Figure 12:
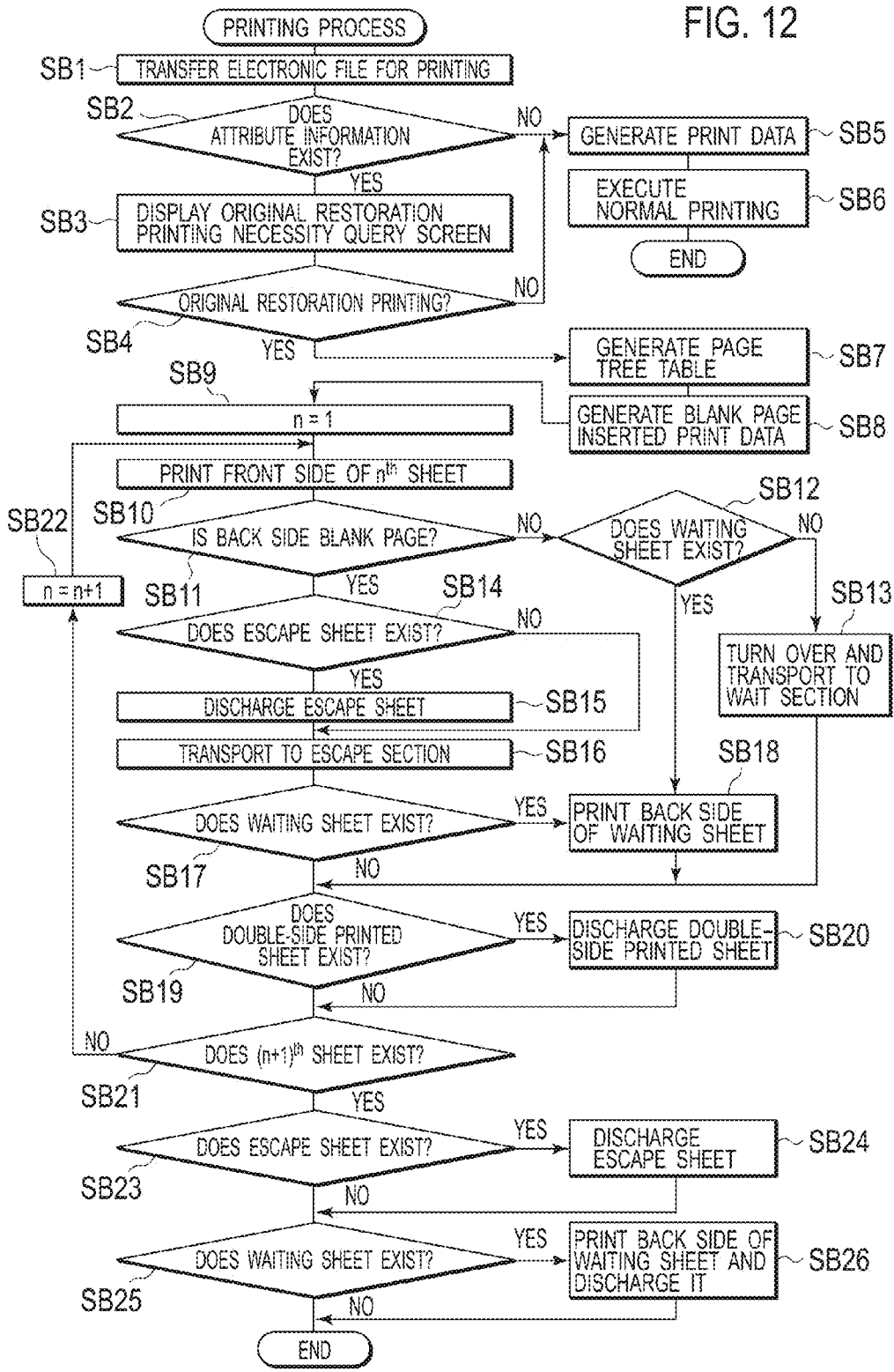
FIG. 12 is a flowchart of a printing process according to the second embodiment.

FIG. 9 is a block diagram showing a printer unit according to the second embodiment, FIG. 10 is an explanatory view of the configuration of a printing mechanism according to the second embodiment, FIG. 11 is an enlarged explanatory view showing the vicinity of a selector according to the second embodiment, and FIG. 12 is a flowchart showing the printing process according to the second embodiment.

Note that printing mechanism 40 shown in FIG. 10 shows a state where paper feeding trays 45 are omitted. In the second embodiment, the same reference numerals are used to denote the same or equivalent portions as those of the first embodiment, and the description of the portions are not repeated in order to avoid redundant description.

As shown in FIG. 9, printer unit 5 of the second embodiment includes image processing unit 20, printing unit 21, blank printing selection unit 22, and blank page inserting unit 23 that are the same as in the first embodiment, and further includes printing order controlling unit 51, discharging order controlling unit 52, and selector 53.

As shown in FIG. 10, printing mechanism 40 of the second embodiment includes printing unit 21, paper feeding tray 45, wait section 47, that are the same as the first embodiment, and further includes selector 53 as a transport direction controller and escape section 55 as a medium escape section.

As shown in FIG. 11, selector 53 includes plural flappers 56 for switching the direction of conveying of a single-side printed sheet, which is a print sheet whose front side has been printed by printing unit 21, and plural conveying rollers 57 forming their conveying paths. Selector 53 is used for selecting the direction of transporting a single-side print sheet, whose back side needs to be printed, to wait section 47 through reverse section 46 (a medium reverse section), or transporting a single-side print sheet, whose back side does not need to be printed (is to be a blank page) and which does not need to be transported to printing unit 21 again, to escape section 55.

Such selector 53 transports single-side printed sheets from fixing unit 44 of printing unit 21 by conveying rollers 57a along the direction of arrow M by switching the conveying direction with flappers 56a. In the case of a single-side printed sheet whose back side needs to be printed, selector 53 transports the single-side printed sheet to conveying rollers 57b of reverse section 46 by guides 56b, 56c and rotation of conveying rollers 57a, transports it in the direction of arrow N by temporary rotation of conveying rollers 57b, transports it to conveying rollers 57c by reverse rotation of conveying rollers 57b and flappers 56c so that the single-side printed sheet is turned over, and then transports it to wait section 47 along the direction of arrow J by rotation of conveying rollers 57b. In the case of a single-side printed sheet whose back side does not need to be printed and is to be blank, selector 53 transports the single-side printed sheet to conveying rollers 57d of escape section 55 by flappers 56b, 56d and rotation of conveying rollers 57a, transports the single-side printed sheet in the direction of arrow O by rotation of conveying rollers 57d, makes the single-side printed sheet temporarily escape in a passage of escape section 55, transports the one-side printed sheet that escaped in escape section 55 to conveying rollers 57e by flappers 56d and reverse rotation of conveying rollers 57d, and then transports the single-side printed sheet in the direction of arrows P, L.

Printing order controlling unit 51 controls conveyance of the print sheet in printing mechanism 40 during the printing by controlling selector 53, such as a conveyance of the print sheet from paper feeding tray 45 to printing unit 21 (arrow H), a conveyance of the print sheet from wait section 47 to printing unit 21 (arrow K), a conveyance of the print sheet from printing unit 21 to reverse section 46 via selector 53 (arrow M, arrow N), and a conveyance of the print sheet from reverse section 46 to wait section 47 (arrow J).

Discharging order controlling unit 52 controls selector 53 to control, in printing mechanism 40, the order of discharging the printed sheets, which includes the single-side printed print sheet that escapes from escape section 55 and whose back side is the blank page and the double-side printed sheet that was turned over at reverse section 46 and waited in wait section 47 and then was printed on the back side thereof at printing unit 21, thereby discharging the printed sheet onto sheet discharge stage 48 in the same order as the original document. That is, discharging order controlling unit 52 controls among a conveyance from printing unit 21 toward sheet discharge stage 48 (arrow L), a conveyance from printing unit 21 to escape section 55 via selector 53 (arrow M, arrow O), and a conveyance from escape section 55 toward sheet discharge stage 48 (arrow P, arrow L).

Note that the second embodiment is described assuming that two print sheets can be conveyed in the apparatus in a manner that the two print sheets have a conveyance interval there-between; one print sheet in a conveying passage from wait section 47 to printing unit 21; and the other print sheet in escape section 55.

Next, control flow of a printing process according to the second embodiment will be described with reference to steps shown in FIG. 12.

Steps SB1 to SB8 in the second embodiment are the same as or similar to steps SA1 to SA8 in the first embodiment, and thus a description of steps SB1 to SB8 is omitted.

Note that normal printing in step SB6 uses reverse section 46 of the second embodiment.

Step SB9: After creating the blank page inserted print data, controller 7 initializes counter "n" for document sheet number to "1" based on the blank page inserted print data, in order to execute original restoration printing according to the second embodiment in which pages of the electronic file are printed on the print sheets in the same page configuration as the original document.

Step SB10: Controller 7 reads the print data of both sides of document sheet number "n" (the 1st document sheet in this state) from the blank page inserted print data and temporarily stores it in the storage. In the meantime, controller 7 specifies one of paper feeding trays 45a to 45e (for example, paper feeding tray 45a) containing therein print sheets appropriates to print the page image of the print data, and feeds the $n^{th}$ print sheet (a 1st print sheet in this state) from paper feeding tray 45a to printing unit 21 along the directions of arrow C and arrow H by controlling printing order controlling unit 51, and then prints the print data of the corresponding page on the front side of the $n^{th}$ print sheet.

Step SB11: After printing on the front side of the $n^{th}$ print sheet, controller 7 controls printing order controlling unit 51 to determine, based on the page tree table, whether or not a back side of the $n^{th}$ document sheet is blank. Controller 7 proceeds to step SB14 when the back side of the $n^{th}$ document sheet is blank, and proceeds to step SB12 when the back side of the $n^{th}$ document sheet is not blank.

Step SB12: After determining that the back side of the $n^{th}$ document sheet is not blank, controller 7 checks whether or not there is a waiting sheet (which is, the print sheet that has waited in wait section 47). When there is a waiting sheet, controller 7 determines that the back side of the waiting sheet needs to be printed and thus proceeds to step SB18. When there is no waiting sheet, controller 7 proceeds to step SB13.

Step SB13: After determining that there is no waiting sheet, controller 7 transports the single-side printed sheet, which is the print sheet on whose front side the print data is printed, from printing unit 21 in the direction of arrow M by controlling printing order controlling unit 51, transports single-side printed sheet to reverse section 46 along the direction of arrow N by controlling selector 53, transports single-side printed sheet to wait section 47 along the direction of arrow J by controlling selector 53 so that the single-side printed sheet is turned over, makes the turned-over single-side printed sheet wait at wait section 47, and then proceeds to step SB19.

Step SB14: After determining that the back side of the $n^{th}$ document sheet is blank, controller 7 checks whether or not there is an escape sheet, which is the print sheet that has escaped in escape section 55. Controller 7 proceeds to step SB15 when there is an escape sheet, and proceeds to step SB16 when there is no escaped sheet.

Step SB15: After determining that there is a waiting sheet, controller 7 transports the escape sheet, whose back side is blank, from escape section 55 in the direction of arrow P and L by discharging order controlling unit 52, thereby discharging it into sheet discharge stage 48.

Step SB16: After determining that there is no escaped sheet or having already discharged a previous escaped sheet, controller 7 transports the single-side printed sheet on whose back side is to be blank from printing unit 21 in the direction of arrow M by printing order controlling unit 51, and transports the single-side printed sheet in the direction of arrow O by selector 53, thereby making the single-side printed sheet wait in escape section 55.

Step SB17: After making the single-side printed sheet on whose back side is to be blank wait at escape section 55, controller 7 checks whether or not there is a waiting sheet in wait section 47. When there is the waiting sheet, controller 7 determines the back side of the waiting sheet needs to be printed and proceeds to step SB18. When there is no waiting sheet, controller 7 proceeds to step SB19.

Step SB18: After determining that the back side of the waiting sheet needs to be printed, controller 7 transports the waiting sheet from wait section 47 to printing unit 21 along the direction of arrow K by printing order controlling unit 51, and prints the print data of the back side of the (n−1)$^{th}$ document sheet temporarily stored in the storage on the back side of the single-side printed sheet, which was the waiting sheet, and then proceeds to step SB19.

Step SB19: Controller 7 checks whether or not there is a double-side printed sheet, which is the print sheet whose back side has been printed, in printing unit 21. Controller 7 proceeds to step SB20 when there is a double-side printed sheet, and proceeds to step SB21 when there is no double-side printed sheet in printing unit 21.

Step SB20: After determining that there is a double-side printed sheet in printing unit 21, controller 7 transports the double-side printed sheet from printing unit 21 in the direction of arrow L by discharging order controlling unit 52, thereby discharging the double-side printed sheet onto sheet discharge stage 48.

Step SB21: Controller 7 refers to the page tree table and checks whether or not there is print data of the next document sheet (the (n+1)$^{th}$ document sheet). When there is print data of the (n+1)$^{th}$ document sheet, controller 7 determines to continue printing on the print sheets and thus proceeds to step SB22. When there is no print data of the (n+1)$^{th}$ document sheet, controller 7 proceeds to step SB23.

Step SB22: After determining to continue printing on the print sheets, controller 7 increments the current document sheet number by adding "1" to document sheet number "n" in order to treat the print data of the next document sheet, and proceeds back to step SB10 to continue printing on a next print sheet according to steps SB10 to SB21.

Step SB23: After determining that there is no data of the (n+1)$^{th}$ document sheet, controller 7 checks whether or not there is an escape sheet in escape section 55. Controller 7 proceeds to step SB24 when there is an escape sheet, and proceeds to step SB25 when there is no escaped sheet.

Step SB24: After determining that there is an escape sheet, controller 7 transports the escape sheet, which is the single-side printed sheet whose back side is to be blank, from escape section 55 in the direction of arrow P and arrow L by discharging order controlling unit 52, thereby discharging the single-side printed sheet into sheet discharge stage 48, and then proceeds to step SB25.

Step SB25: After determining that there is no escaped sheet, controller 7 checks whether or not there is a waiting sheet in wait section 47. When there is a waiting sheet, controller 7 determines the need to print the back side of the waiting sheet and thus proceeds to step SB26. When there is no waiting sheet, controller 7 ends the printing process.

Step SB26: After determining to need to print the back side of the waiting sheet, controller 7 transports the print sheet, which was the waiting sheet, from wait section 47 to printing unit 21 along the direction of arrow K by printing order controlling unit 51, and prints the print data of the back side of the corresponding document sheet temporarily stored in the storage on the back side of the print sheet, which was the waiting sheet, to form a double-side printed sheet. Then controller 7 transports the double-side printed sheet from printing unit 21 in the direction of arrow L by discharging order controlling unit 52 thereby discharging the double-side printed sheet into the sheet discharge stage 48, and then ends the printing process.

Next, flow of original restoration printing described with reference to the above flow chart shown in FIG. 12 will be described with reference to printing processes GA1 to GA8 shown in FIG. 13.

Note that the following description will be described assuming that the original document comprising the four document sheets has the same page configuration as the printout shown in FIG. 8.

Process GA1: Controller 7 specifies one of paper feeding trays 45a to 45e (for example, paper feeding tray 45a) containing therein print sheets appropriate to print the page image of the print data, and feeds a 1st print sheet from paper feeding tray 45a to printing unit 21 along the direction of arrow C and arrow H, and prints the print data of page number 1 on a front side of the 1st print sheet. (n=1 in step SB10)

Process GA2: After printing on the front side of the 1st print sheet, controller 7 transports the 1st print sheet on whose back side is to be printed to reverse section 46 along the directions of arrow M and arrow N, transports to wait section 47 along the direction of arrow J so that the 1st print sheet is turned over, and makes the turned-over 1st print sheet wait in wait section 47 (Yes in step SB11, No in step SB12, and step SB13). At the same time, controller 7 feeds a 2nd print sheet from paper feeding tray 45a to printing unit 21, and prints the print data of page number 3 on a front side of the 2nd print sheet. ("No" in step SB19, "No" in step SB21, step SB22, and "n=2" in step SB10)

Process GA3: After printing on the front side of the 2nd print sheet, controller 7 transports the 2nd print sheet on whose back side is to be blank to escape section 55 along the directions of arrow M and arrow O, and makes the 2nd print sheet escape in escape section 55 ("Yes" in step SB11, "No" in step SB14, and step SB16). At the same time, controller 7 transports the turned-over 1st print sheet that waited at wait section 47 to printing unit 21 along the direction of arrow K and prints the print data of page number 2 on the back side of the 1st print sheet. ("Yes" in step SB17, and step SB18)

Process GA4: After printing on the back side of the 1st print sheet, controller 7 transports the 1st print sheet, on whose front side the print data of page number 1 is printed and on whose back side the print data of page number 2 is printed, along the direction of arrow L, thereby discharging the 1st print sheet ("Yes" in step SB19, and step SB20). At the same time, controller 7 feeds a 3rd print sheet from paper feeding tray 45a to printing unit 21, and prints the print data of page number 4 on the front side of the 3rd print sheet ("No" in step SB21, step SB22, and "n=3" in step SB10).

Process GA5: After printing on the front side of the 3rd print sheet, controller 7 transports the 2nd print sheet on whose back side is to be blank from escape section 55 along the directions of arrow P and arrow L thereby discharging the 2nd print sheet, and transports the 3rd print sheet on whose back side is to be blank along the directions of arrow M and arrow O thereby making the 3rd print sheet escape in escape section 55 ("Yes" in step SB1, "Yes" in step SB14, step SB15, and step SB16). At the same time, controller 7 feeds a 4th print sheet from paper feeding tray 45a to printing unit 21, and prints the print data of page number 5 on the front side of the 4th print sheet ("No" in step SB17, "No" in step SB19, "No" in step SB21, SB22, and "n=4" in step SB10).

Process GA6: After printing on the front side of the 4th print sheet, controller 7 transports the 4th print sheet on whose back side needs to be printed to reverse section 46 along the directions of arrow M and arrow N, further transports from reverse section 46 to wait section 47 along the direction of arrow J so that the 4th print sheet is turned over, and makes the turned-over 4th print sheet in wait section 47 ("Yes" in step SB11, "No" in step SB12, and step SB13). At the same time, controller 7 transports the 3rd print sheet whose back side is to be blank from escape section 55 along the directions of arrow P and arrow L, thereby discharging the 3rd print sheet ("No" in step "No" in step SB19, "Yes" in step SB21, "Yes" in step SB23, and step SB24).

Process GA7: Next, controller 7 transports the turned-over 4th print sheet from wait section 47 to printing unit 21 along the direction of arrow K, and prints the print data of page number 6 on the back side of the 4th print sheet ("Yes" in step SB25, and SB26).

Process GA8: After printing on the back side of the 4th print sheet, controller 7 discharges the 4th print sheet, on whose front side the print data of page number 5 is printed and on whose back side the print data of page number 6 is printed, by transporting the 4th print sheet along the direction of arrow L (step SB26).

In this way, like the first embodiment, the second embodiment forms a printout that is the same as in FIG. 8 having the four print sheets on which the original document page configuration is printed, by inserting the blank pages in the electronic data of the pages without the blank pages that are integrated in the electronic file. The second embodiment, however, has the seven printing process in the original restoration printing, which is less than the eight printing process in the original restoration printing in the first embodiment, thereby improving a speed of printing in image forming apparatus 1.

Note that the second embodiment is described assuming that two print sheets can be conveyed in the apparatus in a manner that the two print sheets have the conveyance interval there-between; one print sheet in the conveying passage from wait section 47 to printing unit 21; and the other print sheet in escape section 55. However, a conveyance interval between the print sheets may be shorter than the second embodiment such that two or more print sheets are transported at the same time in the conveying passage from wait section 47 to printing unit 21 with providing two or more escape sections. For example, in a case that two print sheets are transported at the same time in the conveying passage from wait section 47 to printing unit 21, two escape sections are needed.

As described above, the second embodiment provides the escape section where a print sheet, whose back side does not need to be printed and is to be blank, can temporarily escape in the print sheet. Thus, the print sheet, whose backside does not need to be printed on and is to be blank, does not need to be transported to the printing unit again. Therefore the second embodiment improves the printing speed of the original restoration printing in which the blank pages are inserted, in addition to the same effect as that of the first embodiment.

Note that although the user inputs instructions such as the reading instruction or the printing instruction via the operation panel provided in the image forming apparatus in the above embodiments, the instructions may be input through an external apparatus connected to the interface controller.

Note that although the image forming apparatus is a MFP in the above embodiments, the image forming apparatus may be a printer (SFP), a facsimile machine, a copy machine, the like, or an apparatus combining these.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image forming apparatus comprising:
a storage unit configured to store electronic files wherein one or more files includes specific information;
an operation unit configured to select a stored electronic file for printing;
a printing unit configured to print images on media;
an inquiry unit configured to, when the selected file includes the specific information and in response to a print instruction executed through the operation unit, make a single inquiry to a user to select between printing images of the selected stored electronic file having a first configuration with blank pages or printing images of the selected stored electronic file having a second configuration without the blank pages and,
an output unit configured, based on the single inquiry, to output print data having one of the first configuration and the second configuration for an entirety of the selected electronic file,
wherein the inquiry unit executes the single inquiry when the specific information is included in the selected electronic file and does not execute the single inquiry when the specific information is not included in the selected electronic file.

2. The image forming apparatus of claim 1, wherein the specific information includes information as to blank pages.

3. An image reading apparatus comprising:
an image reader configured to read both sides of sheets of an original document to generate page images thereof;
an attribute information supplier configured to attach, to the page image of each page, attribute information including a page number of a corresponding page in the original document and a distinction whether the corresponding page is a front side or a back side of the sheet of the original document, when the page image is not a blank page;
an electronic file generator configured to generate an electronic file by integrating non-blank page images, which are the page images with no blank pages;
an attribute information extractor configured to read attribute information of each page image from an electronic file generated by an image reading apparatus;
a printing unit configured to print images on media; and
a controller configured to control the printing unit, based on the read attribute information and non-blank page images in the electronic file, to print images having the same page configuration as the original document with a blank page, wherein
a selection unit configured to enable a user to select between printing images having the same page configuration as the original document with the blank page or printing images having the same page configuration as the electronic file without the blank page.

4. The image forming apparatus according to claim 3, further comprising:
a medium reverse section configured to turn over a medium whose front side is printed; and
a medium escape section configured to cause the medium whose front side is printed to temporarily escape therein.

5. The image forming apparatus according to claim 4, further comprising:
a first conveyer configured to convey a medium having passed through the printing unit to the medium escape section, when a back side of the medium having passed through the printing unit does not need to be printed;
a second conveyer configured to convey a medium having passed through the printing unit to the printing unit again through the medium reverse section while turning the medium over in the medium reverse section, when the back side of the medium having passed through the printing unit needs to be printed; and a discharging order controller configured to control discharging the medium that has temporarily escaped in the medium escape section and the medium whose back side has been printed in the printing unit.

6. An apparatus comprising:

a storage unit configured to store electronic files wherein one or more files includes specific information;

an operation unit configured to select a stored electronic file for printing;

an inquiry unit configured, when the selected file includes the specific information to make a single inquiry to a user to select between printing with a first configuration having blank pages or printing with a second configuration having no blank pages; and an output unit configured, based on response to the inquiry, to output print data having one of the first configuration and the second configuration for an entirety of the selected electronic file, wherein the print data is utilized for printing, wherein the inquiry unit executes the single inquiry when the specific information is included in the selected electronic file and does not execute the single inquiry when the specific information is not included in the selected electronic file.

7. The apparatus of claim 6, wherein the specific information includes information as to blank pages.

* * * * *